(12) United States Patent
Chen et al.

(10) Patent No.: US 10,748,282 B2
(45) Date of Patent: Aug. 18, 2020

(54) IMAGE PROCESSING SYSTEM, APPARATUS, METHOD AND STORAGE MEDIUM

(71) Applicant: CANON KABUSHIKI KAISHA, Tokyo (JP)

(72) Inventors: Bin Chen, Tokyo (JP); Daisuke Furukawa, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 45 days.

(21) Appl. No.: 16/055,618

(22) Filed: Aug. 6, 2018

(65) Prior Publication Data

US 2019/0050983 A1 Feb. 14, 2019

(30) Foreign Application Priority Data

Aug. 9, 2017 (JP) .................. 2017-154460

(51) Int. Cl.
| | |
|---|---|
| *G06T 7/00* | (2017.01) |
| *G06T 7/11* | (2017.01) |
| *G06T 7/73* | (2017.01) |
| *G06K 9/00* | (2006.01) |
| *G06K 9/32* | (2006.01) |

(52) U.S. Cl.
CPC .............. *G06T 7/0012* (2013.01); *G06K 9/00* (2013.01); *G06K 9/3233* (2013.01); *G06T 7/11* (2017.01); *G06T 7/74* (2017.01); *G06T 7/75* (2017.01); *G06K 2209/053* (2013.01); *G06T 2207/10081* (2013.01); *G06T 2207/10088* (2013.01); *G06T 2207/20081* (2013.01); *G06T 2207/30061* (2013.01)

(58) Field of Classification Search
CPC ............ G06K 2209/053; G06K 9/3233; G06T 2207/10081; G06T 2207/10088; G06T 7/0012; G06T 7/11
See application file for complete search history.

(56) References Cited

U.S. PATENT DOCUMENTS

| | | | |
|---|---|---|---|
| 2006/0246458 A1* | 11/2006 | Kiyuna | .............. G06K 9/00127 435/6.12 |
| 2010/0135544 A1* | 6/2010 | Mattiuzzi | .................. G06T 7/33 382/128 |

(Continued)

FOREIGN PATENT DOCUMENTS

JP          2016-7270 A    1/2016

*Primary Examiner* — David Bilodeau
(74) *Attorney, Agent, or Firm* — Canon U.S.A., Inc. IP Division

(57) ABSTRACT

An image processing system includes a first setting unit configured to set, in a learning image, a plurality of mutually different position coordinates belonging to a region of interest presenting a site of interest rendered in the learning image, an extracting unit configured to extract the region of interest by using the plurality of position coordinates, a calculating unit configured to calculate a feature value for determining an attribute of the site of interest from a plurality of extraction results of the region of interest corresponding to the plurality of position coordinates, and a constructing unit configured to construct an identifier for determining the attribute based on a plurality of the feature values corresponding to the plurality of extraction results of the region of interest and a correct answer value of the attribute of the site of interest rendered in the learning image.

10 Claims, 11 Drawing Sheets

(56) References Cited

U.S. PATENT DOCUMENTS

| | | | |
|---|---|---|---|
| 2010/0329529 A1* | 12/2010 | Feldman | G06K 9/6252 |
| | | | 382/131 |
| 2012/0014578 A1* | 1/2012 | Karssemeijer | G06T 7/0012 |
| | | | 382/131 |
| 2015/0366500 A1* | 12/2015 | Aoyagi | A61B 5/4842 |
| | | | 600/407 |
| 2016/0135776 A1* | 5/2016 | Chandler, Jr. | G01R 33/4812 |
| | | | 600/411 |
| 2017/0200067 A1* | 7/2017 | Zhou | G06T 7/143 |
| 2018/0114087 A1* | 4/2018 | Kamen | G06K 9/4628 |
| 2018/0181828 A1* | 6/2018 | Sakamoto | G06K 9/4604 |
| 2018/0204111 A1* | 7/2018 | Zadeh | G06N 3/0436 |

* cited by examiner

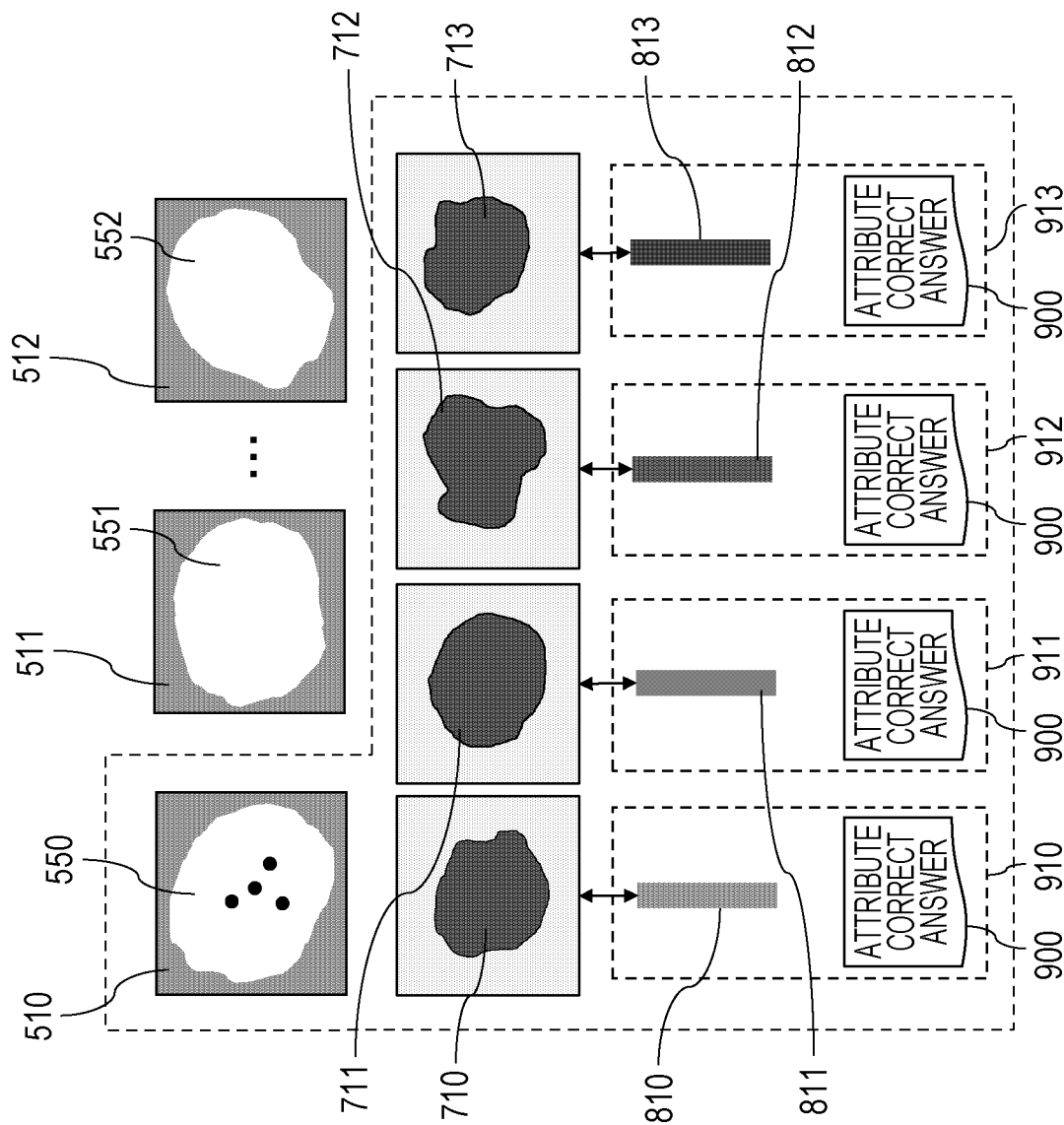

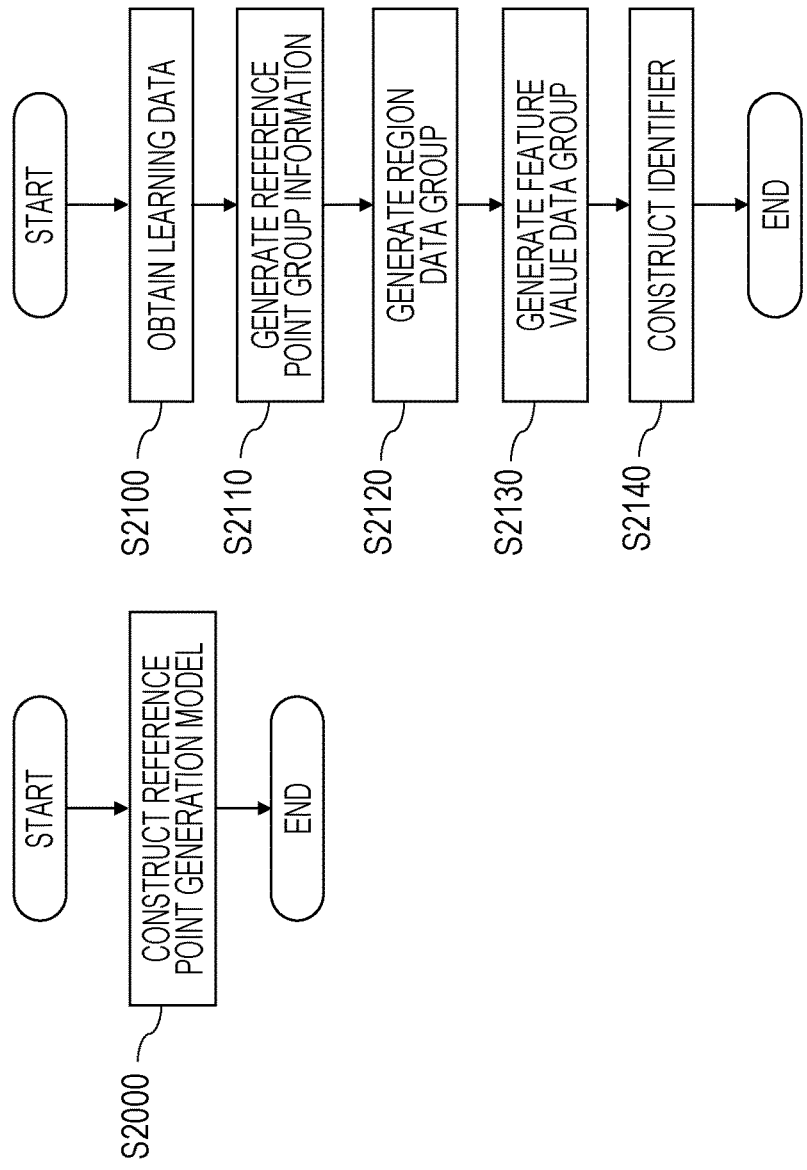

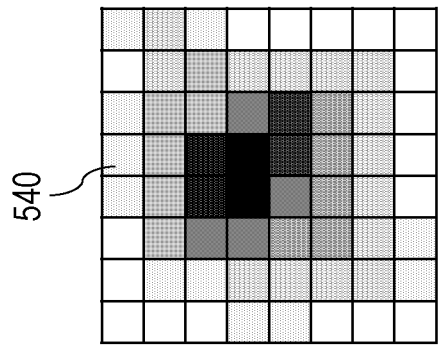
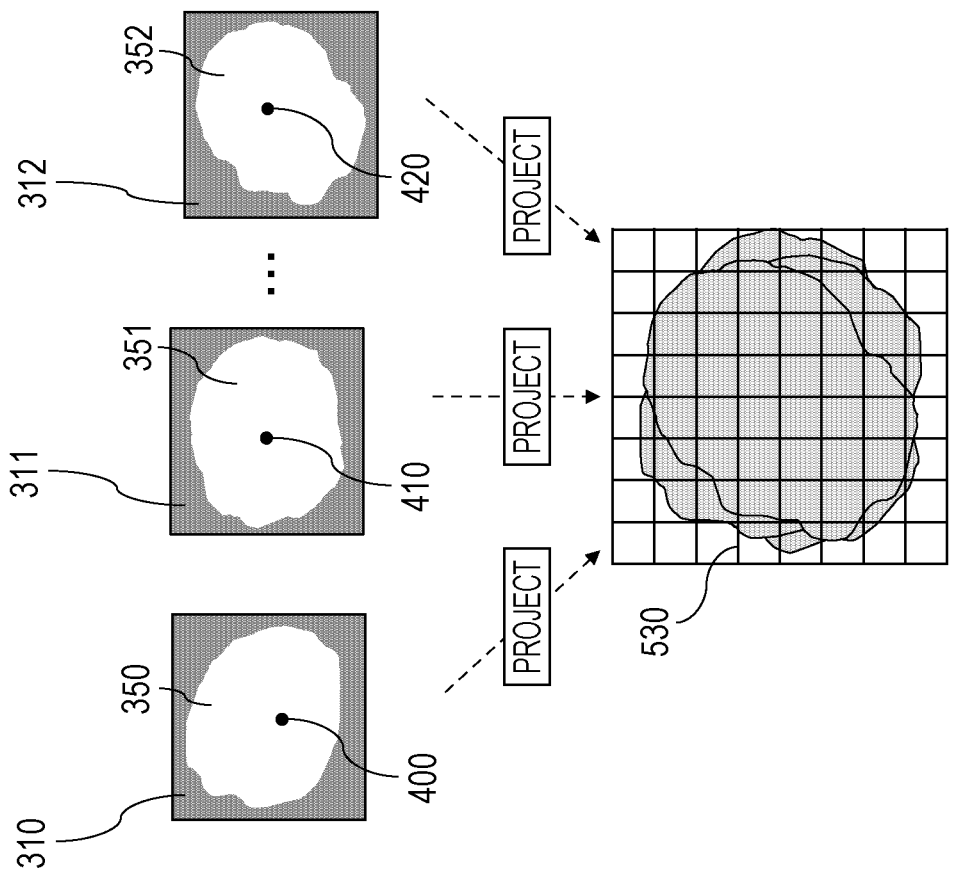

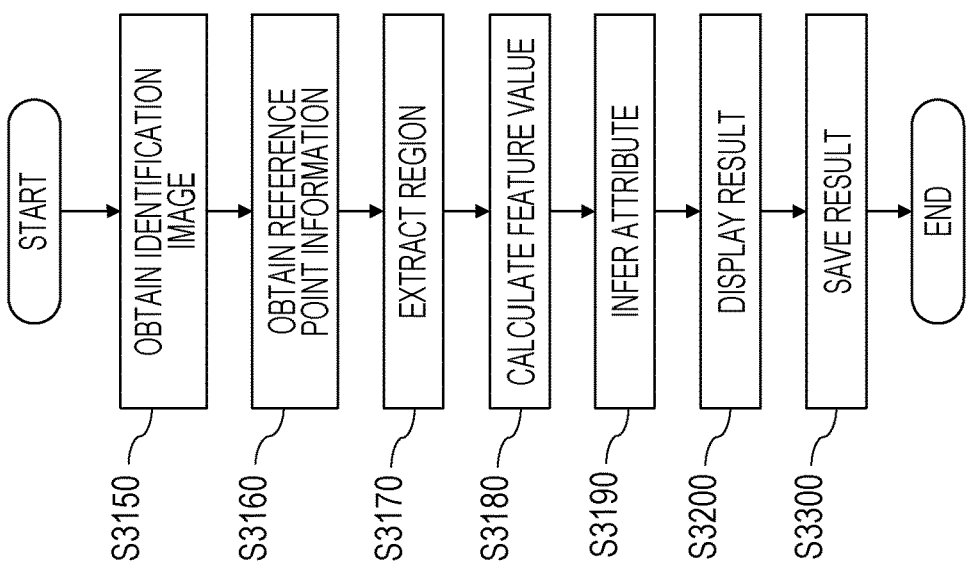
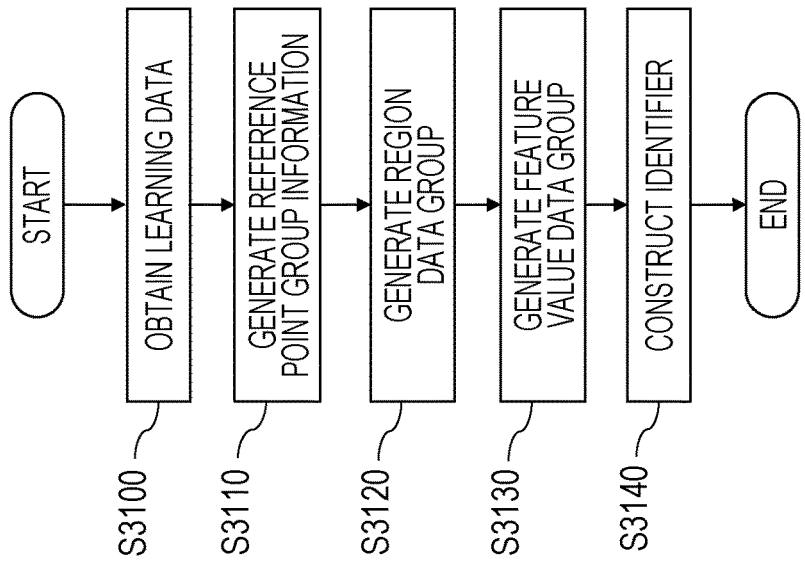
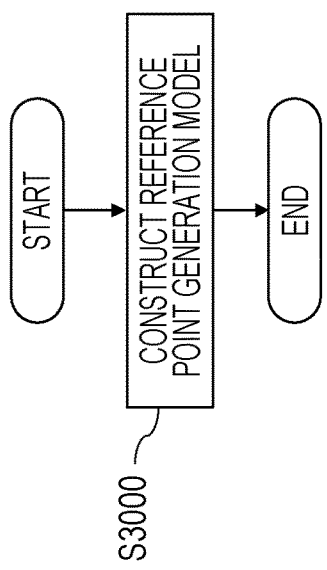
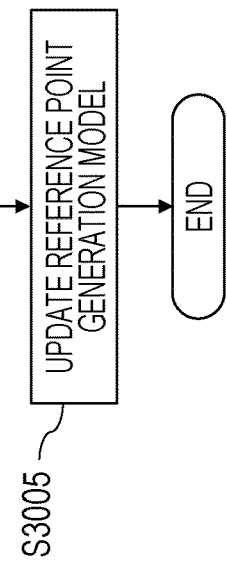

IMAGE PROCESSING SYSTEM, APPARATUS, METHOD AND STORAGE MEDIUM

BACKGROUND OF THE INVENTION

Field of the Invention

The technology disclosed herein relates to an image processing system, an apparatus, a method and a storage medium.

Description of the Related Art

In recent years, many diagnoses and treatments have been performed in medical fields which use medical images such as computer tomography (CT) images and nuclear magnetic resonance (MR) images. In a diagnosis using such a medical image (image diagnosis), a doctor may find an abnormal shadow from a medical image for diagnosis, obtain an attribute of the abnormal shadow, and discriminate the abnormal shadow based on the attribute and clinical information that is obtained in advance.

For the purpose of aiding image diagnoses by a doctor, a computer aided diagnosis or CAD apparatus has been developed which automatically infers and presents what an abnormal shadow in a medical image corresponds to. For example, an apparatus may be considered which calculates a probability that an abnormal shadow (corresponding to a lung tuber) in a chest CT image is a malignant tumor and a probability that it is a benign tumor and presents the results.

Japanese Patent Laid-Open No. 2016-7270 discloses a technology which obtains a region corresponding to an abnormal shadow that is a subject (hereinafter, subject abnormal shadow) from a medical image and its feature value to discriminate whether the subject abnormal shadow is benign or malignant. This technology identifies a region corresponding to a subject abnormal shadow (called region extraction) from a medical image based on positional information (seed point), which is first input by a doctor, of the subject abnormal shadow. After that, a feature value of the identified region is calculated, and whether the subject abnormal shadow is benign or malignant is inferred based on the obtained feature value.

SUMMARY OF THE INVENTION

An image processing system according to an aspect of the present disclosure includes a first setting unit configured to set, in a learning image, a plurality of mutually different position coordinates belonging to a region of interest presenting a site of interest rendered in the learning image, an extracting unit configured to extract the region of interest by using the plurality of position coordinates, a calculating unit configured to calculate a feature value for determining an attribute of the site of interest from a plurality of extraction results of the region of interest corresponding to the plurality of position coordinates, a constructing unit configured to construct an identifier for determining the attribute based on a plurality of the feature values corresponding to the plurality of extraction results of the region of interest and a correct answer value of the attribute of the region of interest rendered in the learning image, a second setting unit configured to set, in an identification image, position coordinates belonging to the region of interest presenting the site of interest rendered in the identification image, and a determining unit configured to determine an attribute of the site of interest rendered in the identification image by using the identifier and the position coordinates set by the second setting unit.

Further features of the present disclosure will become apparent from the following description of exemplary embodiments with reference to the attached drawings.

BRIEF DESCRIPTION OF THE DRAWINGS

FIG. 6 illustrates examples of generation of a feature value data group and construction of an identifier according to the first embodiment.

FIGS. 8A to 8C illustrate examples of procedures to be performed in the image processing apparatus according to the second embodiment.

FIGS. 9A and 9B illustrate examples of construction of a reference point generation model according to the second embodiment.

FIGS. 11A to 11D illustrate examples of procedures to be performed by an image processing apparatus according to the third embodiment.

DESCRIPTION OF THE EMBODIMENTS

With reference to drawings, embodiments will be exemplarily described in detail. It should be noted that components in the embodiments are given for illustration purpose only, and the technical scope of the present disclosure is defined by the claims and is not limited by the following individual embodiments.

First Embodiment

Outline

An image processing apparatus according to a first embodiment performs two processes of a learning process and an identification process. In the learning process, the image processing apparatus first obtains a plurality of position coordinates (reference points) belonging to a lung tuber to be processed (hereinafter, subject lung tuber) from a learning image and obtains a plurality of extraction results (masked images) of the subject lung tuber based on their corresponding reference points. The lung tuber here corresponds to an example of a site of interest, and the region of the lung tuber corresponds to an example of a region of interest. Next, the image processing apparatus calculates feature values of the subject lung tuber corresponding to the obtained masked images and registers them with learning data simultaneously with a correct answer value of an attribute of the subject lung tuber to be obtained. The image processing apparatus constructs an identifier configured to obtain (or infer) an attribute of the subject lung tuber by using the plurality of the registered learning data pieces. Then in the identification process, the image processing apparatus uses the identifier constructed in the learning process to infer an attribute of the lung tuber in an identification image. Here, the term "attribute" may refer to a benign or malignant lung tuber or image findings of a lung tuber, for example. Although a lung tuber on a CT image is to be processed in the following description, the application range of this embodiment is not limited by a subject organ, a tumor, or the type of a modality. A device configuration, a functional configuration and a processing flow will specifically be described below.

Device Configuration

Figure 1:
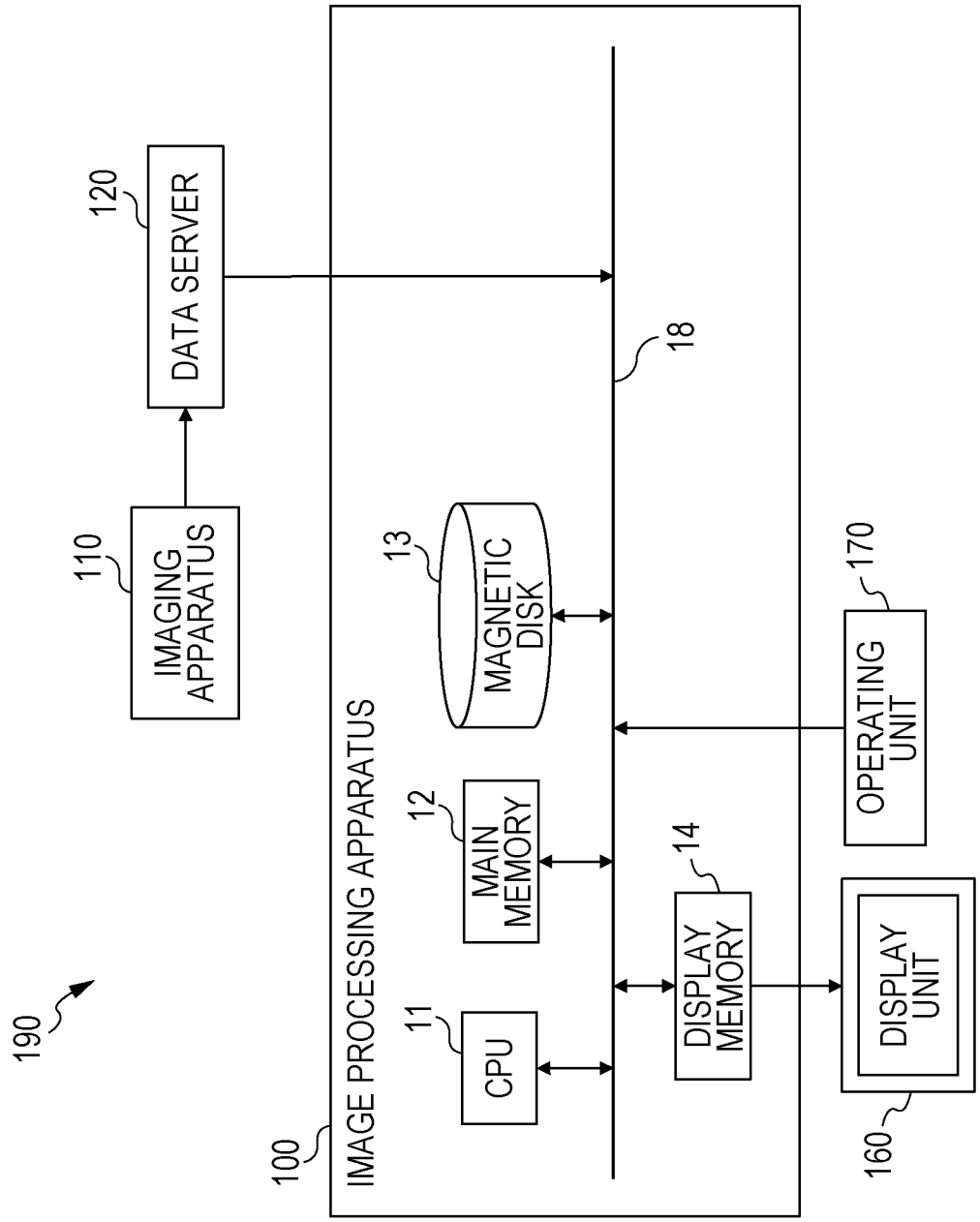
FIG. 1 illustrates an example of a device configuration of an image processing system according to a first embodiment.

With reference to FIG. 1, an image processing system 190 including an image processing apparatus 100 according to the first embodiment of the present disclosure and apparatuses connected to the image processing apparatus 100 will be described in detail. The image processing system 190 includes an imaging apparatus 110 configured to capture an image, a data server 120 configured to store the captured image, the image processing apparatus 100 configured to perform an image process, a display unit 160 configured to display an obtained input image and an image process result, and an operating unit 170 usable by a user for inputting an instruction. The image processing apparatus 100 is configured to obtain an input image and perform an image process on a region of interest shown on the input image. The input image may correspond to an image obtained by performing an image process for obtaining an optimum image for diagnosis on image data obtained by the imaging apparatus 110, for example. The input image according to this embodiment is an image for learning (which will be called a learning image) or an image for identification (which will be called an identification image). These components will be described below. The image processing apparatus 100 may be a computer, for example, and may perform image processing according to this embodiment. The image processing apparatus 100 has a central processing unit (CPU) 11, a main memory 12, a magnetic disk 13, and a display memory 14. The CPU 11 comprehensively controls operations of the components of the image processing apparatus 100.

Under control of the CPU 11, the image processing apparatus 100 may also control operations performed by the imaging apparatus 110. The main memory 12 stores a control program to be executed by the CPU 11 and provides a work area for execution of the program by the CPU 11. The magnetic disk 13 is configured to store application software including an operating system (OS), a device driver for a peripheral apparatus, a program for performing image processing according to this embodiment. The display memory 14 temporarily stores data to be displayed on the display unit 160. The display unit 160 may be a liquid crystal monitor and is configured to display an image based on an output from the display memory 14. The operating unit 170 may be a mouse or a keyboard, for example, and is usable by an operator for inputting positional information or for inputting text. The display unit 160 may be a touch panel monitor configured to receive an operation input, and the operating unit 170 may be a stylus pen. These components are mutually communicably connected via a common bus 18.

The imaging apparatus 110 may be a computed tomography (CT) apparatus, a magnetic resonance imaging (MRI) apparatus, or a digital radiography (DR) apparatus configured to capture a two-dimensional radiographic image, for example. The imaging apparatus 110 transmits an obtained image to the data server 120. An imaging control unit, not illustrated, configured to control the imaging apparatus 110 may be included in the image processing apparatus 100.

The data server 120 is configured to hold an image captured by the imaging apparatus 110. The data server 120 may be a picture archiving and communication system (PACS) server, for example. The image processing apparatus 100 obtains an image from the data server 120 over a network such as a local area network (LAN).

Functional Configuration

Figure 2:
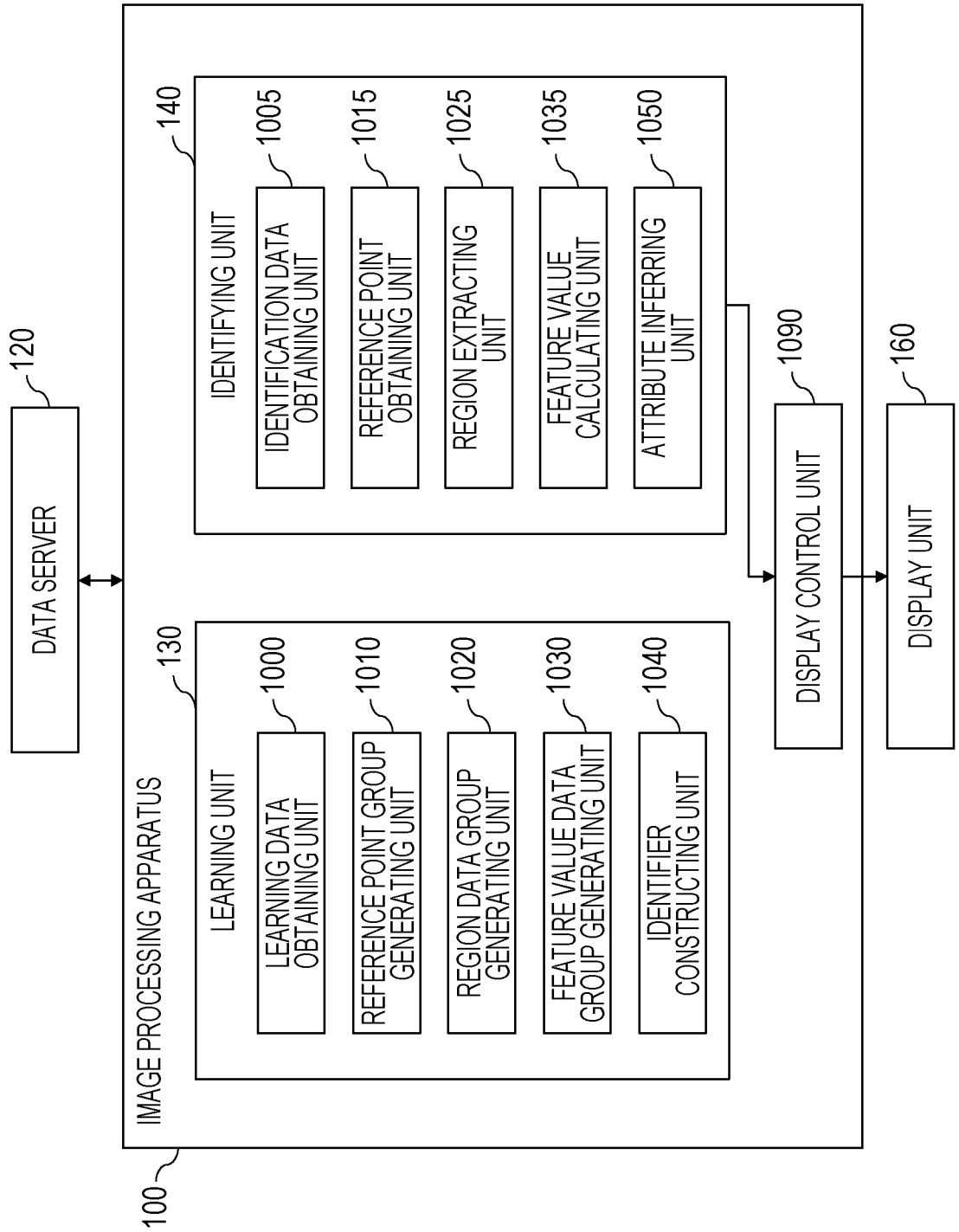
FIG. 2 illustrates an example of a functional configuration of the image processing system according to the first embodiment.

Next, with reference to FIG. 2, a functional configuration of the image processing system including the image processing apparatus 100 according to this embodiment will be described. The CPU 11 executes a program stored in the main memory 12 to implement functions of the components illustrated in FIG. 2. A subject that executes a program may be one or more CPUs, and one or more main memories may be provided as the main memory for storing the program. Instead of or in addition to the CPU, another processor such as a graphics processing unit (GPU) may be used. In other words, at least one processor (hardware) may execute a program stored in at least one memory communicably connected to the processor so that the functions of the components illustrated in FIG. 2 can be implemented.

The image processing apparatus 100 has a learning unit 130, an identifying unit 140 and a display control unit 1090 in its functional configuration. The learning unit 130 further has a learning data obtaining unit 1000, a reference point group generating unit 1010, a region data group generating unit 1020, a feature value data group generating unit 1030, and an identifier constructing unit 1040. The identifying unit 140 has an identification data obtaining unit 1005, a reference point obtaining unit 1015, a region extracting unit 1025, a feature value calculating unit 1035, and an attribute inferring unit 1050. The image processing apparatus 100 is communicably connected to the data server 120 and the display unit 160.

The learning unit 130 is configured to construct an identifier to be used for inferring an attribute of a subject lung tuber.

The learning data obtaining unit 1000 is configured to obtain learning data for constructing an identifier according to this embodiment. The learning data may include a learning image obtained from the data server 120 for undergoing an image process and correct answer data of an attribute of the subject lung tuber rendered on the learning image obtained from the operating unit 170.

The reference point group generating unit 1010 is configured to generate information (hereinafter, reference point information) regarding a plurality of points (hereinafter, reference points) belonging to a region corresponding to the subject lung tuber from the learning image obtained by the learning data obtaining unit 1000.

The region data group generating unit 1020 is configured to generate a plurality of region data pieces (masked images) representing a subject lung tuber region based on the learning image obtained by the learning data obtaining unit 1000 and the plurality of reference point information pieces obtained by the reference point group generating unit 1010. In other words, the region data group generating unit 1020 generates region data for each of the plurality of reference point information pieces to generate a plurality of region data representing the subject lung tuber region. The region data group generating unit 1020 can generate a masked image by using an arbitrary segmentation method such as a region extension method. The region data group generating unit 1020 can perform a region extension method based on image feature values such as pixel values (concentration values) of pixels corresponding to the reference point information to generate a masked image.

The feature value data group generating unit 1030 is configured to obtain a feature value data group representing characteristics of the subject lung tuber by using the learning image obtained by the learning data obtaining unit 1000 and the plurality of region data pieces obtained by the region data group generating unit 1020.

The identifier constructing unit 1040 is configured to construct an identifier for inferring an attribute based on the correct answer data of the attribute of the subject lung tuber obtained by the learning data obtaining unit 1000 and the feature value data group obtained by the feature value data group generating unit 1030, which are registered therewith as learning data.

The identifying unit 140 is configured to infer an attribute of the subject lung tuber rendered on the identification image by using a subject image for identification (hereinafter, identification image) obtained by the identification data obtaining unit 1005.

The identification data obtaining unit 1005 is configured to obtain the identification image included in a subject of the identification according to this embodiment from the data server 120.

The reference point obtaining unit 1015 is configured to obtain information regarding a reference point belonging to a region corresponding to the subject lung tuber rendered on the identification image obtained by the identification data obtaining unit 1005.

The region extracting unit 1025 is configured to obtain a masked image (extraction result) representing a region corresponding to the subject lung tuber based on the identification image obtained by the identification data obtaining unit 1005 and the reference point information regarding the subject lung tuber obtained by the reference point obtaining unit 1015. The region extracting unit 1025 can generate a masked image by using an arbitrary segmentation method such as a region extension method. The region extracting unit 1025 can perform a region extension method based on image feature values such as pixel values (concentration values) of pixels corresponding to the reference point information to generate a masked image.

The feature value calculating unit 1035 is configured to calculate a feature value of the subject lung tuber by using the identification image obtained by the identification data obtaining unit 1005 and an extraction result corresponding to the subject lung tuber obtained by the region extracting unit 1025.

The attribute inferring unit 1050 is configured to infer an attribute of the subject lung tuber based on the feature value, which is input to the identifier constructed by the identifier constructing unit 1040 and obtained by the feature value calculating unit 1035.

The display control unit 1090 is configured to output information regarding a subject obtained through processes performed by the identifying unit 140 to the display unit 160 and to cause the display unit 160 to display results of the processes.

At least a part of the components of the image processing apparatus 100 may be implemented as an independent apparatus. The image processing apparatus 100 may be a work station. The functions of the components may be implemented as software which runs on a computer, and the software implementing the functions of the component may run on a server via a network such as a cloud. The following embodiments assume that the components are implemented by software which runs on a computer installed in a local environment.

Processing Flow

Figure 3B:
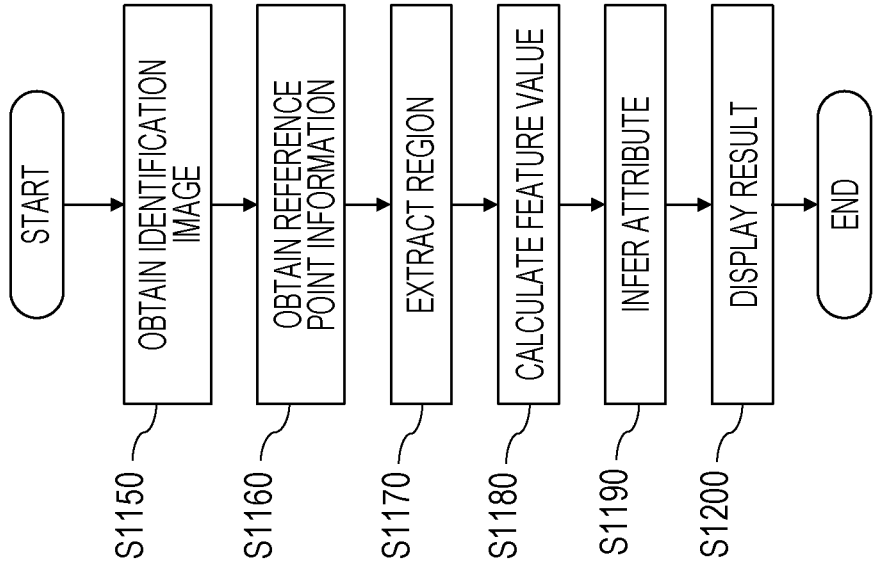
FIGS. 3A and 3B illustrate examples of procedures to be performed by the image processing apparatus according to the first embodiment.
Figure 3A:
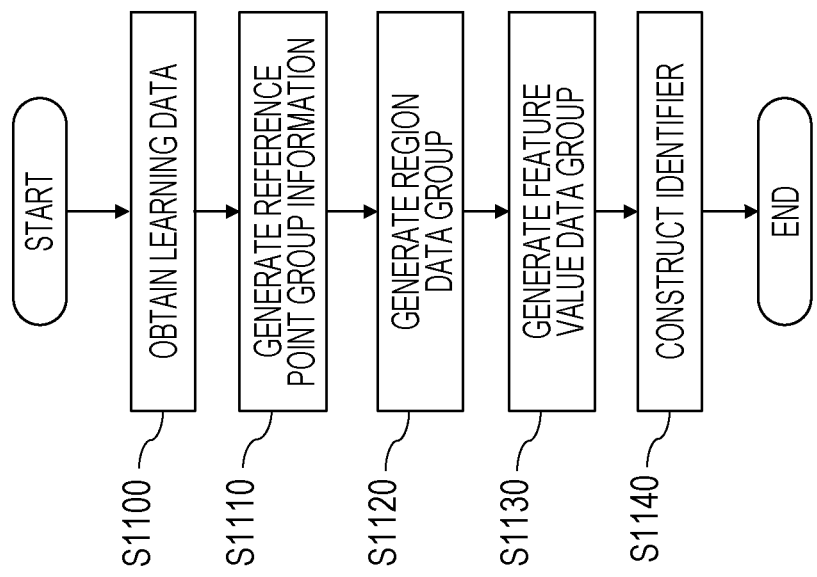

Next, image processes according to the first embodiment of the present disclosure will be described. FIGS. 3A and 3B illustrate procedures of processes to be executed by the image processing apparatus 100 according to this embodiment. This embodiment is implemented by a program executed by the CPU 11, where the program is stored in the main memory 12 and implements functions of the components. According to this embodiment, a CT image is to be processed. The CT image is obtained as a three-dimensional gray image. According to this embodiment, a lung tuber is an example of a processing subject included in a subject image.

First, processing (steps S1100 to S1140) to be executed in a learning process by the image processing apparatus 100 according to the first embodiment will be described. This process is executed in a stage where the image processing apparatus 100 according to this embodiment is constructed. In the learning process, after the image processing apparatus 100 according to the first embodiment applies processing from steps S1100 to S1130 on a plurality of learning data pieces (details of which will be described below), all of the results therefrom are used to perform the processing in step S1140. For omission of any repetitive descriptions, a case will be described in which the processing from step S1110 to step S1130 is applied to one learning data.

S1100

In step S1100, the learning data obtaining unit 1000 obtains a learning data piece A to construct an identifier configured to identify an attribute of a subject lung tuber. The learning data A is a set of a processing subject image (learning image) $I_A(x,y,z)$ and correct answer data piece $D_A$ of an attribute of a subject lung tuber rendered in the learning image.

Here, the learning image according to this embodiment includes a plurality of pixels at positions located based on three-dimensional orthogonal coordinates (x,y,z). A pixel size that is one attribute of the image is defined for each of directions of three-axis coordinates. According to this embodiment, the pixel sizes in x, y, z directions are referred to as r_size_x, r_size_y, and r_size_z, respectively, and are larger than 1.0 mm though the pixel sizes are not limited to the values. The pixel values of the subject image are determined for each of three-dimensional coordinates (x,y,z). Therefore, the subject image can be regarded as data defined by a function $I_A(x,y,z)$ having a three-dimensional coordinate value as an argument.

First, the learning data obtaining unit 1000 obtains a CT image that is a processing subject image from the data server 120 and stores it in the main memory 12 in the image processing apparatus 100. As another example, the learning data obtaining unit 1000 obtains an image data captured by the imaging apparatus 110 via a communication unit, performs an image process for obtaining an image suitable for diagnosis and obtains the result as a learning image according to this embodiment. In a case where the imaging apparatus 110 is a CT apparatus, for example, a CT image data piece including a pixel value called a HU (Hounsfield Unit) value is obtained from the imaging apparatus 110.

Next, the learning data obtaining unit 1000 obtains a correct answer data piece $D_A$ for an attribute of a subject lung tuber rendered in the obtained learning image. The correct answer data piece for an attribute can be a correct answer value for the attribute of the subject lung tuber rendered at I(x,y,z) which is input by an operator (doctor) through the operating unit 170, for example.

S1110

In step S1110, the reference point group generating unit 1010 generates, as a reference point, n points $P_{Ai}(x_{Ai}, y_{Ai}, z_{Ai})$ (i=1, 2, . . . , n) belonging to the subject lung tuber in the learning image $I_A(x,y,z)$. The n points $P_{Ai}$ may be at different positions from each other, for example. Here, a set having $P_{Ai}$ as its component is assumed as a reference point group $P_A=\{P_{Ai}|i=1, 2, \ldots, n\}$. An example of the generation of a reference point group from a learning image will be described.

Figure 4:
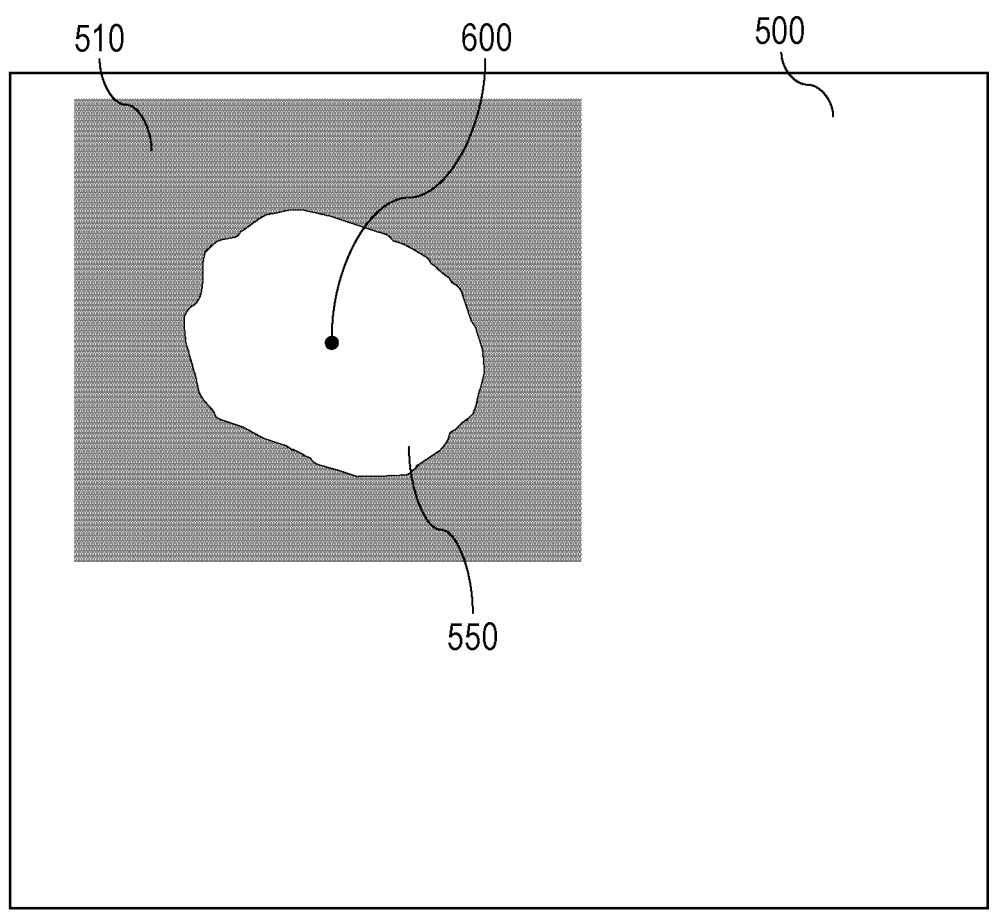
FIG. 4 illustrates an example of generation of reference point information according to the first embodiment.

First, with reference to axial, sagittal and coronal tomographic images, for example, of the learning image $I_A(x,y,z)$ displayed on the display unit 160, an operator may select one pixel included in the subject lung tuber through the operating unit 170. The reference point group generating unit 1010 then obtains the pixel obtained through the operation input as an initial reference point $P_{A1}$. Next, the reference point group generating unit 1010 selects another reference point with reference to $P_{A1}$ and obtains a reference point group $P_{Ai}$(i=2, 3, . . . , n). This processing may be executed on a local image region $V_A(x,y,z)$ including $P_{A1}$, for example. The local image region $V_A(x,y,z)$ is cropped from the learning image I(x,y,z) about $P_{A1}$ based on a predetermined size. Alternatively, an operator can manually crop the local image region $V_A(x,y,z)$ from $I_A(x,y,z)$ through the operating unit 170. Furthermore, a technology based on a scale space such as a Laplacian of Gaussian (LoG) kernel is used to roughly estimate the size of the subject lung tuber, and the local image region $V_A(x,y,z)$ can be set based on the estimated size. FIG. 4 illustrates examples of a local image 510 including a subject lung tuber 550 and an initial reference point 600 which are obtained from the learning image 500.

The reference point group $P_A$ is obtained by applying an image process unit 1 to the local image region $V_A(x,y,z)$. The image process unit 1 may be a process for searching a pixel having a feature similar to that of $P_{A1}$ from $V_A(x,y,z)$, for example. Here, the term "feature" refers to a concentration value, $V_A(x,y,z)$ or the like. The image process unit 1 may be a process for searching a pixel having a high possibility (likelihood) of belonging to the subject lung tuber from $V_A(x,y,z)$ based on advance knowledge. As an example of this case, a blobness structure enhancement filter based on an Eigen value of a Hessian matrix is applied to $V_A(x,y,z)$, and a pixel having a high filter output level is selected as a reference point to generate a reference point set P. Instead of the blobness structure enhancement filter, an LoG kernel or a Scale-Invariant Feature Transform (SIFT) feature point detection process may be used as the image process unit 1.

S1120

Figure 5B:
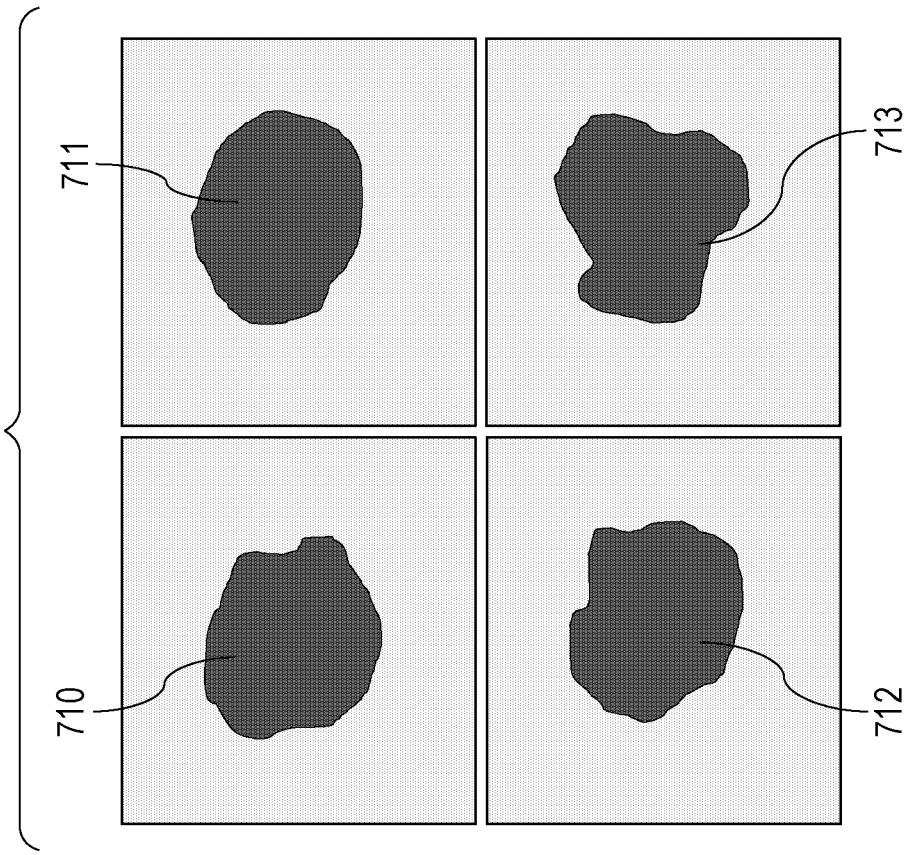
FIGS. 5A and 5B illustrate examples of generation of a region data group according to the first embodiment.
Figure 5A:
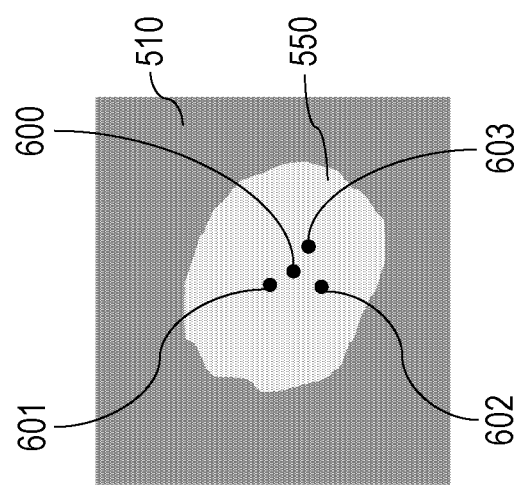

In step S1120, the region data group generating unit 1020 generates a region data group of the subject lung tuber from the learning image $I_A(x,y,z)$ through a region extraction process. The region data group generating unit 1020 performs the region extraction process with respect to the reference points by using the learning image $I_A(x,y,z)$ obtained in step S1100 and the reference point group $P_A$ and the local image region $V_A(x,y,z)$ obtained in step S1110. Through this process, region data (masked image) of the lung tuber can be obtained which has a one-to-one correspondence relation with each of the reference points. With reference to FIGS. 5A and 5B, a region extraction process to be performed in a case where four (n=4) reference points are obtained in step S1110 will be described below. The number of reference points is only required to be plural and is not limited to the value above.

As illustrated in FIG. 5A, the region data group generating unit 1020 performs a region extraction process on the subject lung tuber 550 based on a reference point 600, a reference point 601, a reference point 602, and a reference point 603, and thus obtains region data corresponding to the reference points. The region extraction process may be performed on $I_A(x,y,z)$ but may be performed on a local image region $V_A(x,y,z)$. According to this embodiment, the local image region 510 is used to perform the region extraction process. The region extraction process is performed by a region extraction algorithm such as a region extension method, a Level-set method or a Graph-cut method by defining a reference point as a foreground region (seed) of the subject lung tuber region. The region extraction process may use one predetermined region extraction algorithm for all of subject lung tubers, or the region extraction algorithm may be changed in accordance with the shape or property of the subject lung tuber. For example, machine learning or a Graph-cut method may be used for a lung tuber with ground glass opacity (GGO) while a Level-set method may be used for a lung tuber having an irregular shape and a small cubic content. The extraction algorithm may be changed based on a characteristic of each of different reference points in one subject lung tuber.

An operator may visually evaluate accuracy of the extraction from the plurality of obtained region data pieces of the subject lung tuber and may delete a region data piece having a low accuracy. Then, the region data group finally obtained from the learning image $I_A(x,y,z)$ is defined as $R_A=\{R_{Aj}|=1, 2, \ldots, m\}$ (m<n). FIG. 5B illustrates examples of a region data piece 710, a region data piece 711, a region data piece 712, and a region data piece 713 obtained based on the reference point 600, the reference point 601, the reference point 602, and the reference point 603, respectively.

S1130

In step S1130, the feature value data group generating unit 1030 obtains a feature value data group of the subject lung tuber. The feature value data group generating unit 1030 calculates a feature value of the subject lung tuber based on the learning image $I_A(x,y,z)$ obtained in step S1100, the local image region $V_A(x,y,z)$ obtained in step S1110, and the region data group $R_A$ of the subject lung tuber obtained in step S1120.

The calculation of a feature value of the subject lung tuber starts from a region data piece $R_Aj$ in the region data group $R_A$ of the subject lung tuber obtained in step S1120. For example, in a case where a feature value is to be calculated by using the region data piece $R_{A1}$, the feature value data group generating unit 1030 calculates a shape feature value region represented by the data piece $R_{A1}$ or a texture feature value of a region overlapping $R_{A1}$ or a surrounding region of the region $R_{A1}$ in $I_A(x,y,z)$. The feature value may be a publicly known general image feature value pr a feature value calculated by a calculation method based on an attribute of a subject lung tuber to be obtained. For example, in a case where an attribute to be inferred by the image processing apparatus 100 is image findings of the subject lung tuber, a special feature value may be calculated based on a clinical image findings item frequently used by a doctor.

A feature value data piece $F_{A1}$ is calculated based on the region data piece $R_{A1}$. The feature value data group obtained after the feature value calculations are performed based on all region data pieces $R_A$ is referred to as $F_A=\{F_{Aj}|=1, 2, \ldots, m\}$.

In a case where a correct answer region $R_G$ of the subject lung tuber is prepared in advance in the learning image, the feature value data group generating unit 1030 calculates a feature value of the subject lung tuber based on the correct answer region $R_G$ to obtain a feature value $F_{AG}$. The feature value data group generating unit 1030 may calculate a matching degree between $F_{AG}$ and each feature value of $F_A=\{F_{Aj}|=1, 2, \ldots, m\}$ and may delete a feature value with a lower matching degree from $F_A$. Here, the matching degree calculation may be based on a Mahalanobis distance in a feature space, for example. This processing excludes a feature value data piece calculated from an extraction result with lower accuracy from training data for identifier construction to prevent reduction of accuracy of an identifier to be constructed in a next step.

S1140

In step S1140, the identifier constructing unit 1040 constructs an identifier for inferring an attribute of the lung tuber. First, the identifier constructing unit 1040 registers a set of the correct answer data $D_A$ of the attribute obtained in step S1100 and the feature value group data $F_A$ obtained in step S1130 as training data with the main memory 12 in the image processing apparatus 100. In other words, the identifier constructing unit 1040 registers the correct answer data $D_A$ and the feature value group data $F_A$ with the main memory 12 in association. Here, a plurality of training data pieces (training data group) is registered by repeating the processing from step S1100 to step S1130 as required.

With reference to FIG. 6, the registration of a training data group will be described. It is assumed here that feature values 810, 811, 812, and 813 correspond to the region data pieces 710, 711, 712, and 713 obtained from the four reference points in the subject lung tuber 550. By setting the feature values and the correct answer 900 of the attribute, training data pieces 910, 911, 912 and 913 can be obtained. The same processing is performed on other subject lung tubers, and all training data pieces obtained therefrom are registered as a training data group.

After the training data group is registered, the identifier constructing unit 1040 constructs an identifier by using the registered training data group. The identifier applies a publicly known technology such as Random Forest (RF), SupportVector Machine (SVM), or Neural Network. The training data group is input to the identifier and an optimum parameter for obtaining an attribute from the feature value is searched to construct an identifier by which the attribute of the lung tuber can be identified. The constructed identifier is referred to as $C_{pro}$.

Up to this point, the processing for constructing an identifier $C_{pro}$ by the image processing apparatus 100 according to this embodiment by using learning data (or processing of the learning process) has been described. Next, processing for inferring an attribute of a lung tuber rendered in an unknown image (identification image) by using the constructed $C_{pro}$ (processing of an identification process in steps S1150 to S1200) will be described.

S1150

In step S1150, the identification data obtaining unit 1005 obtains an identification image for identifying an attribute of a lung tuber. In other words, the identification data obtaining unit 1005 obtains an identification image from the data server 120 and stores it in the main memory 12 in the image processing apparatus 100.

Because the identification image acquisition is performed by the same processing as the acquisition of learning data from the data server 120 by the learning data obtaining unit 1000 in step S1100, any repetitive descriptions will be omitted. The obtained identification image is referred to as $I_{rec}(i,j,k)$.

S1160

In step S1160, the reference point obtaining unit 1015 obtains a reference point of a lung tuber to be identified (identification subject lung tuber). The reference point obtaining unit 1015 obtains a pixel $P_{seed\_rec}$ belonging to a region of the identification subject lung tuber rendered in the identification image $I_{rec}(i,j,k)$ obtained in step S1150.

The $P_{seed\_rec}$ can be manually selected with reference to a tomographic image of the identification image $I_{rec}(i,j,k)$ displayed on the display unit 160 by an operator, like the initial reference point $P_{A1}$ in step S1100. The initial reference point $P_{A1}$ may be automatically detected from $I_{rec}(i,j,k)$ by using a reference point detection scheme.

S1170

In step S1170, the region extracting unit 1025 extracts a region of the identification subject lung tuber from the identification image. The region extracting unit 1025 extracts the region of the identification subject lung tuber at $I_{rec}(i,j,k)$ and obtains its extraction result based on the identification image $I_{rec}(i,j,k)$ obtained in step S1150 and the reference point $P_{seed\_rec}$ obtained in step S1160.

Because the extraction of the region of the identification subject lung tuber by the region extracting unit 1025 is the same as the processing for obtaining region data pieces corresponding to the reference points by the region data group generating unit 1020 in step S1120, any repetitive descriptions will be omitted. The extraction result (masked image) of the identification subject lung tuber obtained from the identification image is referred to as $R_{rec}(i,j,k)$.

S1180

In step S1180, the feature value calculating unit 1035 calculates a feature value of the identification subject lung tuber. The feature value calculating unit 1035 calculates a feature value of the identification subject lung tuber based on the identification image $I_{rec}(i,j,k)$ obtained in step S1150 and extraction result $R_{rec}(i,j,k)$ obtained in step S1170.

Because the calculation of a feature value of the identification subject lung tuber is the same as the processing for calculating feature values corresponding to region data pieces of the region data group $R_A$ by the feature value data group generating unit 1030 in step S1130, any repetitive descriptions will be omitted. The obtained feature value of the identification subject lung tuber is referred to as $F_{rec}$.

S1190

In step S1190, the attribute inferring unit 1050 infers an attribute of the identification subject lung tuber. The attribute inferring unit 1050 inputs the feature value $F_{rec}$ obtained in step S1180 to the identifier $C_{pro}$ constructed in step S1140 to obtain an attribute of the subject lung tuber.

The feature value $F_{rec}$ input to the identifier $C_{pro}$ is projected to an identification space generated with feature values of training data used for constructing the $C_{pro}$, and a class of the attribute to which the feature value $F_{rec}$ belongs in the identification space is obtained so that the attribute of the subject lung tuber can be inferred.

S1200

In step S1200, the display control unit 1090 controls to display the processing result on the display unit 160. The display control unit 1090 causes the display unit 160 to display at least one of the extraction result of the identification subject lung tuber, the feature value information, and the attribute inference result. In this case, the display control unit 1090 transmits the extraction result, the feature value information and the information regarding the attribute to the display unit 160 connected to the image processing apparatus 100 and controls to display them on the display unit 160.

The display control unit 1090 superimposes these information pieces on the identification image $I_{rec}(i,j,k)$ that is the input image for display on the display unit 160. In this case, the display control unit 1090 may generate three-dimensional image information having those information pieces thereon by rendering for display on the display unit 160. The display control unit 1090 may generate a predetermined cross-sectional image of the superimposed three-dimensional image for display on the display unit 160.

Effects of the image processing apparatus according to the first embodiment will be described. The image processing apparatus according to this embodiment can solve a problem present in a publicly known technology relating to discrimination of an attribute of an abnormal shadow. The problem is that a conventional discrimination technology which receives different positional information pieces regarding an identical lung tuber region provides different region extraction results and different feature value calculation results and, as a result, different attribute discrimination results may sometimes be obtained. In other words, the problem is about reproducibility. The reproducibility problem may easily occur in a case where different operators perform attribute discrimination processes on one lung tuber region, for example. This is because different positional information pieces are input when different operators input positional information pieces for one lung tuber region. This problem may occur when one operator inputs the information pieces. Even when one operator inputs positional information pieces at different times for one lung tuber region, the input positional information pieces may differ.

On the other hand, in the image processing apparatus according to this embodiment, based on a plurality of positional information pieces for one learning image, an abnormal shadow region is extracted, and feature values are calculated. Then, those results and a correct answer value of an attribute of the abnormal shadow in the learning image are used as learning data to construct an identifier for inferring the attribute. Thus constructed identifier even having received different positional information pieces input by an operator or operators can absorb differences occurring in the extraction and the feature value calculation so that an attribute inference result with high reproducibility can be obtained.

Therefore, the image processing apparatus according to the first embodiment of the present disclosure has an effect that an attribute of an abnormal shadow can be inferred with high reproducibility even when an operator or operators inputs or input different positional information pieces regarding the abnormal shadow.

Second Embodiment

Outline

Next, with reference to drawings, an example of a second embodiment will be described in detail. Any repetitive descriptions on like components, functions, and operations in the first and second embodiments will be omitted, and differences from the first embodiment will mainly be described.

In the image processing apparatus according to the second embodiment, a model generating unit 150 in step S2000 constructs a reference point generation model. In step S2110, a reference point group generating unit 1018 generates reference points of a subject lung tuber rendered in a learning image by using the reference point generation model. Because the reference point generation model is constructed from a reference point actually input by an operator, there is a high probability that the reference point group generated based thereon will be set in a real scene. Thus, a more appropriate attribute identifier can be constructed. Functional configuration and a processing flow will be specifically described below.

Functional Configuration

Figure 7:
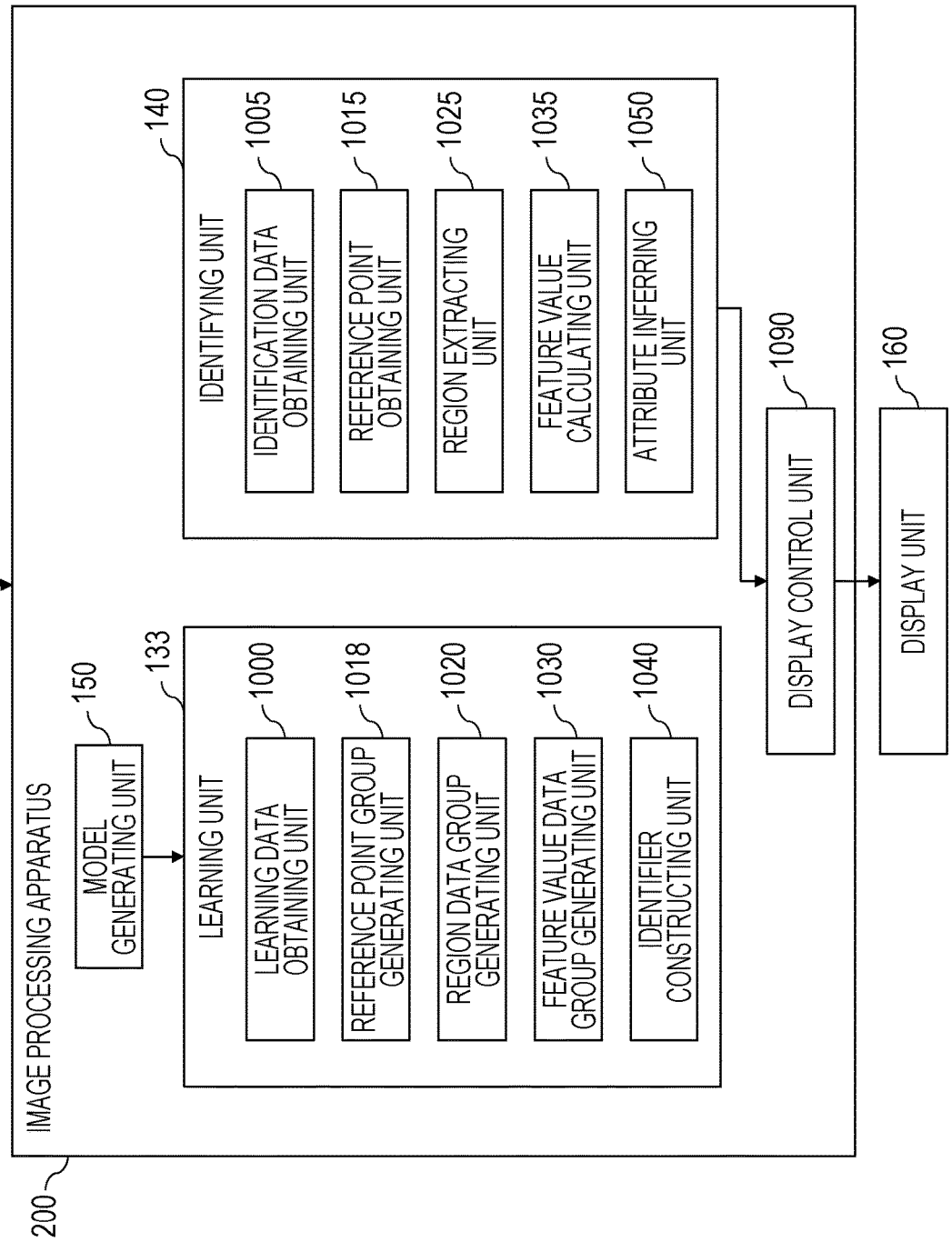
FIG. 7 illustrates an example of a functional configuration of an image processing system according to a second embodiment.

With reference to FIG. 7, a functional configuration of an image processing apparatus 200 according to the second embodiment of the present disclosure will be described. Like numbers to the numbers in FIG. 2 refer to like components having like functions in the first and second embodiments, and any repetitive descriptions will be omitted. As illustrated in FIG. 7, the image processing apparatus 200 according to this embodiment includes, in a functional configuration, the model generating unit 150, a learning unit 133, an identifying unit 140, and a display control unit 1090. The model generating unit 150 may be implemented by a processor, like the first embodiment. The learning unit 133 further has a learning data obtaining unit 1000, a reference point group generating unit 1018, a region data group generating unit 1020, a feature value data generating unit 1030, and an identifier constructing unit 1040. The identifying unit 140 has an identification data obtaining unit 1005, a reference point obtaining unit 1015, a region extracting unit 1025, a feature value calculating unit 1035, and an attribute inferring unit 1050. The image processing apparatus 200 is connected to a data server 120 and a display unit 160.

The model generating unit 150 is configured to construct a reference point generation model that is a probability model representing a possibility (likelihood) that positions (pixels) in an image space are set as reference points. The reference point group generating unit 1018 is configured to generate a plurality of reference points from the learning image based on the reference point generation model.

Processing Flow

Next, image processing according to the second embodiment will be described. FIGS. 8A, 8B, and 8C illustrate procedures of a model construction process, a learning process, and an identification process to be executed by the image processing apparatus 200 according to this embodiment. This embodiment is implemented by a program executed by the CPU 11 where the program is stored in the main memory 12 and implements functions of the components.

Because the processing in step S2100 and step S2120 to step S2200 is the same as the processing in step S1100 and step S1120 to step S1200 illustrated in FIG. 3, any repetitive detail description will be omitted.

S2000

In step S2000, the model generating unit 150 constructs a reference point generation model. The model generating unit 150 learns by using a plurality of input images (training images for the reference point generation model construction) and information regarding reference points (hereinafter, regarding point information) belonging to a subject lung tuber rendered in the images from the data server 120 and constructs a reference point generation model. Here, the reference point information may be input in advance (or in the past) or may be input by an operator through the operating unit 170.

With FIGS. 9A and 9B, the reference point generation model construction will be described. The reference point generation model is a probability model representing possibilities (likelihoods) that pixels are designated as reference points in an image space in the model. The construction of a reference point generation model is started with projection of reference point information regarding a plurality of input training images 310 to 312 and reference points 400, 410, and 420 for reference point generation model construction including the subject lung tubers 350 to 352 to a normalized image space 530 as illustrated in FIG. 9A. Here, the image to be projected may be an input training image or may be a partial image of an input training image including a subject lung tuber region. According to this embodiment, the image to be projected is a partial image $B_A(i,j,k)$ cropped in a bounding box for the subject lung tuber region. One or more reference points are to be designated in each of the images to be projected. The reference point or points may be all designated by one operator or may be designated by a plurality of operators.

When the partial image $B_A(i,j,k)$ and the reference point information are projected to the normalized image space 530, the number of reference points projected to pixel positions in the normalized image space 530 is handled as a parameter representing a likelihood of generation of a reference point at each of the pixel positions.

The model generating unit 150 performs the projecting and the likelihood calculating processing on all of the input training images for reference point generation model construction to generate a model representing probabilities that pixels in the normalized image space can be reference points, as illustrated in FIG. 9B, that is, to generate a reference point generation model 540.

S2110

In step S2110, the reference point group generating unit 1018 generates a reference point set (reference point group). The reference point group generating unit 1018 uses the reference point generation model constructed in step S2000 and the learning image obtained in S2100 to obtain a plurality of points belonging to the subject lung tuber rendered in the learning image as a reference point set (reference point group).

Processing will be described which generates a reference point group from a learning image by using the reference point group generation model. First, the reference point group generating unit 1018 projects the learning image to a normalized space of the reference point generation model. Here, like the construction of a reference point generation model, the reference point group generating unit 1018 projects a partial image cropped in a bounding box for a subject lung tuber from the learning image. The reference point group generating unit 1018 selects pixels as a reference point group $P'_A$ on the partial image of the learning image projected to upper n pixel positions in decreasing order of the generation likelihoods in the reference point group generation model.

After that, the processing from step S2120 to step S2140 is sequentially performed so that an identifier $C_{pro}$ for identifying an attribute of the lung tuber can be constructed. The processing of the identification process from step S2120 to step S2200 is performed in the same manner as the processing from step S1150 to step S1200 so that an attribute of the subject lung tuber for identification can be inferred.

According to the second embodiment as described above, a reference point generation model is constructed based on a reference point input by an operator and is used to generate a reference point group of the subject lung tuber from a learning image. Thus, the reference point group can be generated at a position with a high possibility that an operator inputs in a real scene so that an identifier more suitable for the scene can be constructed. The constructed identifier is advantageously used to more properly aid a differential diagnosis.

Third Embodiment

Outline

Next, with reference to drawings, an example of a third embodiment will be described in detail. Any repetitive descriptions on like components, functions, and operations in the first and second embodiments will be omitted, and a difference from the first and second embodiments will mainly be described.

In an image processing apparatus according to the third embodiment, the storage unit 1060 in step S3300 of the identification process stores information such as the reference point information input by an operator in step S3160. In step S3005, the model generating unit 155 performs relearning (additional learning) by adding newly stored reference point information to the reference point model so that the reference point generation model can be updated. Through the additional learning process, the reference point generation model is updated to more fit to an actual custom of the operator. Functional components and a processing flow will be specifically described below.

(Functional Configuration)

Figure 10:
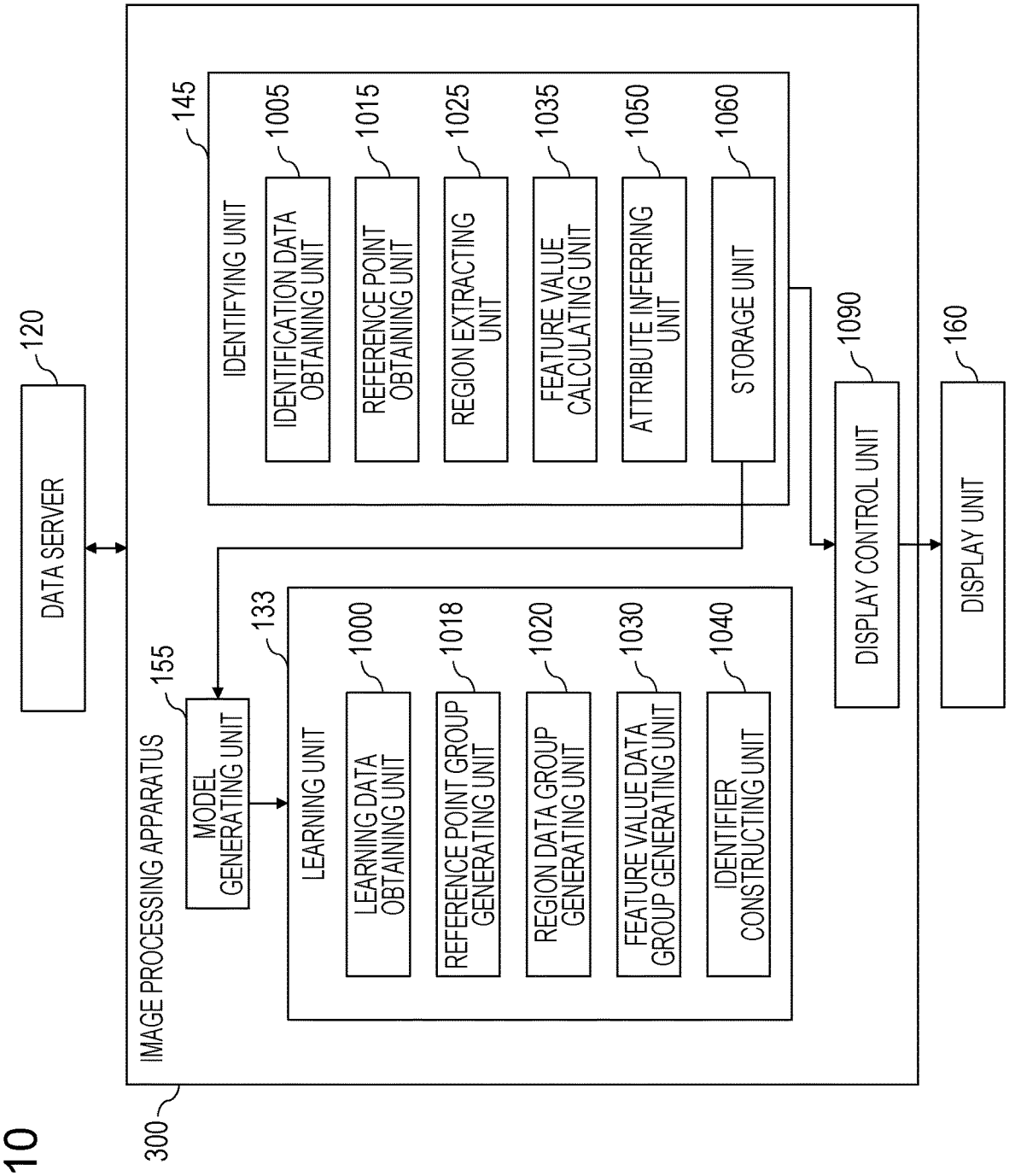
FIG. 10 illustrates an example of a functional configuration of an image processing system according to a third embodiment.

With reference to FIG. 10, functional components included in an image processing apparatus 300 according to the third embodiment of the present disclosure will be described. Like numbers to the numbers in FIG. 7 refer to like components having like functions in the second and third embodiments, and any repetitive descriptions will be omitted. As illustrated in FIG. 10, the image processing apparatus 300 according to this embodiment includes, in a functional component, a model generating unit 155, a learning unit 133, an identifying unit 145, and a display control unit 1090. The model generating unit 155 is also implemented by a processor, like the first embodiment. The learning unit 133 further includes a learning data obtaining unit 1000, a reference point group generating unit 1018, a region data group generating unit 1020, a feature value data generating unit 1030, and an identifier constructing unit 1040. The identifying unit 145 includes an identification data obtaining unit 1005, a reference point obtaining unit 1015, a region extracting unit 1025, a feature value calculating unit 1035, an attribute inferring unit 1050, and a storage unit 1060. The image processing apparatus 300 is connected to a data server 120 and a display unit 160. The storage unit 1060 is configured to store, in the main memory 12, information obtained in the reference point obtaining unit 1015, the region extracting unit 1025, the feature value calculating unit 1035, and the attribute inferring unit 1050. The model generating unit 155 updates an existing reference point generation model by obtaining reference point information newly stored in the main memory 12 and performing additional learning. Through the update, information pieces input by an identical operator are gradually incorporated into the reference point generation model so that a model that fits to customs of the operator can be constructed.

Processing Flow

Next, image processing according to the third embodiment will be described. FIGS. 11A, 11B, 11C and 11D illustrate procedures of a model construction process, a learning process, an identification process and a and model update process to be executed by the image processing apparatus 300 according to this embodiment. This embodiment is implemented by a program executed by the CPU 11 where the program is stored in the main memory 12 and implements functions of the components.

Because the processing excluding processing in step S3300 in the model construction process, the learning process and the identification process is the same as the processing in the construction process, the learning process, and the identification process according to the second embodiment illustrated in FIGS. 8A to 8C, any repetitive detail descriptions will be omitted.

S3300

In step S3300, the storage unit 1060 stores the reference point information obtained in step S3160 in the main memory 12. At the same time, the storage unit 1060 may further store in the main memory 12 the region data obtained in step S3170, the feature value information obtained in step S3180, and the attribute information obtained in step S3190, for example.

S3005

In step S3005, the model generating unit 155 updates the reference point generation model. The model generating unit 155 obtains an identification image stored in the main memory 12 and reference point information input by an operator. By using the obtained identification image and the reference point information, additional learning of the reference point generation model constructed in step S3000 is performed. The additional learning projects the identification image and the reference point information to a normalized image space of the existing reference point generation model and recalculates a reference point likelihood of each of pixels in the normalized space, like learning in the model construction performed in step S2000. Through the projecting and likelihood recalculation processing, the reference point generation model is updated.

When the reference point model is updated, processing of the learning process from step S3100 to step S3140 is executed again to update the identifier $C_{pro}$. Furthermore, when an operator uses the $C_{pro}$ to perform processing for identifying an attribute of a subject lung tuber from a new identification image, the identification process in FIG. 11C, the model update process in FIG. 11D, and the learning process in FIG. 11B are sequentially repeated.

Thus, according to the third embodiment, one operator performs the attribute identification process on a subject lung tuber based on many identification images so that the reference point model and the identifier $C_{pro}$ can be updated to fit to customs of the operator for higher accuracy of attribute identification.

Other Embodiments

The image processing apparatus and image processing system according to the aforementioned embodiments may be implemented as a single apparatus, or apparatuses including a plurality of information processing devices may be communicably connected to execute the processes as described above, which are both comprehended in embodiments of the present disclosure. A common server apparatus or server group may execute the processes as described above. In this case, the common server apparatus corresponds to an image processing apparatus according to an embodiment, and the server group corresponds to an image processing system according to an embodiment. A plurality of apparatuses included in the image processing apparatus and the image processing system may communicate at a predetermined communication rate and may not necessarily exist within an identical facility or an identical country.

Having described the examples of the embodiments in detail, the present disclosure can have modes as a system, an apparatus, a method, a program or a recording medium (storage medium), for example. More specifically, the present disclosure is applicable to a system including a plurality of apparatuses (such as a host computer, an interface device, an imaging apparatus, and a Web application) or is applicable to an apparatus including one device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

Having described the embodiments of the present disclosure in detail, the present disclosure is not limited to such specific embodiments, and various changes, modifications and alterations can be made thereto without departing from the spirit and scope of the claimed present disclosure.

A configuration including a combination of the aforementioned embodiments is also comprehended in embodiments of the present disclosure.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-154460 filed Aug. 9, 2017, which is hereby incorporated by reference herein in its entirety.

What is claimed is:

1. An image processing system comprising:
a memory that stores a program; and
a processor that executes the program stored in the memory to function as units including:
a first setting unit configured to set, in a learning image, a plurality of mutually different position coordinates belonging to a region of interest presenting a site of interest rendered in the learning image;
an extracting unit configured to extract the region of interest by using each of the plurality of position coordinates;

a calculating unit configured to calculate a feature value for determining an attribute of the site of interest from each of a plurality of extraction results of the region of interest corresponding to each of the plurality of position coordinates;

a constructing unit configured to construct an identifier for determining the attribute based on training data including a set of each of a plurality of the feature values corresponding to each of the plurality of extraction results of the region of interest and a correct answer value of the attribute of the site of interest rendered in the learning image;

a second setting unit configured to set, in an identification image, position coordinates belonging to the region of interest presenting the site of interest rendered in the identification image; and a determining unit configured to determine an attribute of the site of interest rendered in the identification image by using the identifier and the position coordinates set by the second setting unit.

2. The image processing system according to claim 1, wherein the first setting unit sets, in the learning image, the position coordinates based on a feature of the region of interest rendered in the learning image.

3. The image processing system according to claim 2, wherein the feature is a concentration value of the region of interest rendered in the learning image.

4. The image processing system according to claim 1, wherein the first setting unit sets, in the learning image, the position coordinates based on position coordinates set in the past.

5. The image processing system according to claim 4, further comprising:
  a generating unit configured to generate a model based on the position coordinates set in the past,
  wherein the first setting unit sets, in the learning image, the position coordinates based on the model.

6. The image processing system according to claim 5, wherein the model is a model representing probabilities that pixels in an image are designated as position coordinates.

7. The image processing system according to claim 5, wherein the model is updated by using positional information set for the identification image.

8. An apparatus comprising:
a memory that stores a program; and
a processor that executes the program stored in the memory to function as units including:
a setting unit configured to set, in a learning image, a plurality of position coordinates belonging to a region of interest presenting a site of interest rendered in the learning image;
an extracting unit configured to extract the region of interest by using each of the plurality of position coordinates;
a calculating unit configured to calculate a feature value for determining an attribute of the site of interest from each of a plurality of extraction results of the region of interest corresponding to each of the plurality of position coordinates; and
a constructing unit configured to construct an identifier for determining the attribute based on training data including a set of each of a plurality of the feature values corresponding to each of the plurality of extraction results of the region of interest and a correct answer value of the attribute of the site of interest.

9. A method comprising:
setting, in a learning image, a plurality of position coordinates belonging to a region of interest presenting a site of interest rendered in the learning image;
extracting the region of interest by using each of the plurality of position coordinates;
calculating a feature value for determining an attribute of the site of interest from each of a plurality of extraction results of the region of interest corresponding to each of the plurality of position coordinates; and
constructing an identifier for determining the attribute based on training data including a set of each of a plurality of the feature values corresponding to the plurality of extraction results of the region of interest and a correct answer value of the attribute of the site of interest.

10. A non-transitory computer-readable storage medium storing a program causing a computer to execute the method according to claim 9.

* * * * *